(12) United States Patent
Sim et al.

(10) Patent No.: US 6,526,011 B1
(45) Date of Patent: Feb. 25, 2003

(54) APPARATUS AND METHOD FOR CONTROLLING VELOCITY OF SPINDLE MOTOR IN OPTICAL DISK REPRODUCING SYSTEM

(75) Inventors: Tae-Hyeon Sim, Seoul (KR); Bom-Yun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/553,537

(22) Filed: Apr. 20, 2000

(30) Foreign Application Priority Data

Oct. 25, 1999 (KR) .............................................. 99-46364

(51) Int. Cl.$^7$ ................................................ G11B 5/09
(52) U.S. Cl. ................................ 369/47.38; 369/47.46; 369/47.48; 369/53.3; 369/53.43
(58) Field of Search ...................... 369/47.48, 47.46, 369/47.36, 47.38, 47.44, 47.45, 47.49, 47.5, 53.3, 53.43

(56) References Cited

U.S. PATENT DOCUMENTS

| | | | | |
|---|---|---|---|---|
| 4,727,530 A | * | 2/1988 | Tomisawa ................. | 369/47.45 |
| 4,809,248 A | * | 2/1989 | Sengoku ..................... | 369/53.3 |
| 4,815,063 A | * | 3/1989 | Aoshima et al. .......... | 369/47.45 |
| 4,882,720 A | * | 11/1989 | Sengoku ................... | 369/53.12 |
| 5,070,492 A | * | 12/1991 | Ogawa et al. ............ | 369/47.28 |
| 5,237,554 A | * | 8/1993 | Senshu et al. ............. | 369/59.2 |
| 5,398,221 A | * | 3/1995 | Ogawa ..................... | 369/30.15 |
| 5,956,307 A | * | 9/1999 | Koudo et al. ............ | 369/47.43 |
| 6,195,321 B1 | * | 2/2001 | Takamine et al. ........ | 369/47.44 |
| 6,212,143 B1 | * | 4/2001 | Teshirogi et al. ........ | 369/47.45 |

* cited by examiner

Primary Examiner—Thang V. Tran
Assistant Examiner—Bach Vuong
(74) Attorney, Agent, or Firm—Mills & Onello LLP

(57) ABSTRACT

A control apparatus and method for controlling a velocity of a spindle motor included in an optical disk reproducing system to prevent a forward or backward overrun of a spindle motor are disclosed. A widest signal detector of the apparatus detects the widest pulse width of an eight-to-fourteen modulation (EFM) signal according to a main clock signal and generates a first status signal representing a status of the pulse width of the detected signal according to a frame clock signal, which is divided by a first predetermined number j. A narrowest signal detector of the apparatus generates a second status signal representing a status of the narrowest pulse width of the first status signals according to the frame clock signal divided by a second predetermined number k, where k is greater than j. An overrun controller increases or decreases or holds a previously counted result according to the frame clock signal divided by the second predetermined number and the second status signal. The overrun controller compares the currently counted result with overrun upper limit and lower limit values and generates first and second flag signals braking the rotation of the spindle motor according to the compared result.

7 Claims, 8 Drawing Sheets

APPARATUS AND METHOD FOR CONTROLLING VELOCITY OF SPINDLE MOTOR IN OPTICAL DISK REPRODUCING SYSTEM

BACKGROUND OF THE INVENTION

1. Field of the Invention

The present invention relates to an optical disk reproducing system, and especially to a control apparatus and method for controlling the velocity of a spindle motor in an optical disk system.

2. Description of the Related Art

An optical disk reproducing system, such as a compact disk player (CDP) or a digital versatile disk player (DVDP), conventionally uses a frame synchronous signal to control the velocity of a spindle motor when playback of a track recorded on an optical disk is commenced, a track jump occurs, or a spindle servo system is unstable. When a spindle servo is unlocked, a conventional spindle motor velocity control apparatus of the optical disk reproducing system operates at a constant linear velocity. The control apparatus detects the length of the frame synchronous signal and uses the length of the frame synchronous signal to make the spindle servo stable. For example, the conventional spindle motor velocity control apparatus of a CDP controls the velocity of the spindle motor based on whether the pulse width of an eight-to-fourteen modulation (EFM) signal is narrower or wider than 11T, where T, the period of a main clock signal (PLCK), is about 231 nanoseconds.

The conventional control apparatus for controlling the velocity of the spindle motor described above can be useful when the disk is normal, that is, there are no abnormalities or imperfections on its surface. However, the conventional control apparatus regards the pattern of the frame synchronous signal as much wider than 11T when some deficiencies such as a scratch or a fingerprint exist on the disk. Thus, in this case, the conventional control apparatus increases the velocity of the spindle motor, which can result in an overrun of the spindle motor.

Furthermore, a slice circuit of the optical disk reproducing system converts a radio frequency (RF) signal to binary data of a CMOS (Complementary Metal Oxide Semiconductor) logic level. Also, the above-described conventional control apparatus for controlling the velocity of the spindle motor can cause the overrun of the spindle motor to occur even when an error occurs in the frame synchronous signal because of an inadequate reference voltage.

SUMMARY OF THE INVENTION

It is an object of the present invention to provide a control apparatus and method for controlling the velocity of a spindle motor in an optical disk reproducing system to prevent backward or forward overrun of the spindle motor.

The invention includes a widest signal detector for detecting the widest pulse width of an EFM signal and/or EFM-PLUS signal in response to a main clock signal. The widest signal detector generates first status signals representing the status of the detected pulse width in response to a frame clock signal which is divided by a first predetermined number j. A narrowest signal detector generates second status signals representing the status of the narrowest pulse width of the first status signals in response to the frame clock signal divided by a second predetermined number k, where k is greater than j. An overrun controller performs up-counting or down-counting or holds a previously counted result corresponding to the frame clock signal divided by the second predetermined number and the second status signals. The overrun controller compares the currently counted result with overrun upper limit and lower limit values, and generates first and second flag signals to brake the rotation of the spindle motor according to the compared result.

In one embodiment, the control apparatus of the invention also includes a pulse width modulation signal generator which generates a velocity control signal with logic levels corresponding to logic levels of the second status signals and transmits the velocity control signal to the spindle motor. The velocity of the spindle motor is controlled, i.e., increased, decreased or held constant, according to the velocity control signal.

In one embodiment, the overrun controller of the invention includes an enable signal generator for generating upward and downward enable signals with logic levels determined by the second status signals. A counter performs up-counting, down-counting and holding constant the previously counted result in response to the upward and downward enable signals during a predetermined period of the frame clock signal divided by the second predetermined number. A flag signal generator compares the currently counted result with the overrun upper limit and lower limit values and generates the first and second flag signals according to the compared result. In one particular embodiment, the flag signal generator includes a first comparator for comparing the currently counted result with the overrun upper limit value and generates the compared result as the first flag signal. A second comparator compares the currently counted result with the overrun lower limit value and generates the compared result as the second flag signal.

In accordance with the method of the invention, at each first predetermined frame interval, the widest pulse width of an EFM signal and/or EFM-PLUS signal is detected. At each second predetermined frame interval wider than the first predetermined frame interval, the narrowest pulse width of the pulse widths detected in the previous step is detected. A previously counted result is up-counted, down-counted or held constant during the second predetermined frame interval according to the status of the detected narrowest pulse width. Braking is applied to the rotation of the spindle motor according to whether the currently counted result is smaller than an overrun upper limit value and greater than an overrun lower limit value.

In one embodiment of the method of the invention, the velocity of the spindle is controlled according to the status of the detected narrowest pulse width.

In accordance with an embodiment of the method of the invention, it is determined whether the detected narrowest pulse width is greater than a predetermined pulse width. If so, then the counted result is up-counted during the second predetermined frame interval. If the detected narrowest pulse width is smaller than the predetermined pulse width, then the counted result is down-counted during the second predetermined frame interval. If the detected narrowest pulse width is the same as the predetermined pulse width, then the counted result is held constant during the second predetermined frame interval. The currently counted result is compared to the upper limit value and the lower limit value. If the currently counted result is between the upper and lower limit values, then it is determined that no overrun has occurred. Rotation of the spindle is stopped if the currently counted result is greater than the overrun upper limit value or smaller than the overrun lower limit value.

The control apparatus and method for controlling the velocity of the spindle motor according to the present invention can stabilize the spindle motor using the status of the pulse width of the EFM signal and/or EFM-PLUS signal when a forward or backward overrun occurs because of flaws on the disk surface.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS OF THE INVENTION

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the invention to those skilled in the art.

Figure 1:
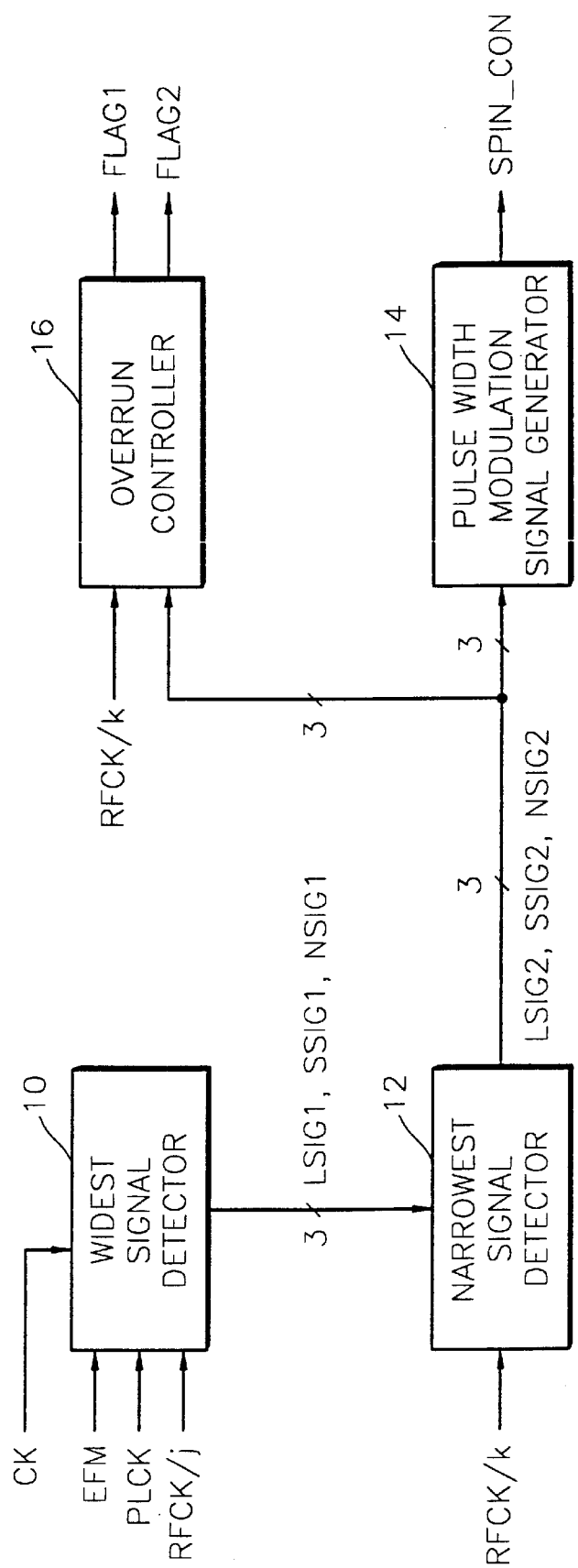
FIG. 1 is a block diagram illustrating one embodiment of a control apparatus for controlling the velocity of a spindle motor in an optical disk reproducing system according to present invention.

FIG. 1 is a block diagram of one embodiment of a control apparatus for controlling the velocity of a spindle motor in an optical disk reproducing system according to the present invention. The control apparatus according to the present invention includes a widest signal detector 10, a narrowest signal detector 12, a pulse width modulation signal generator 14, and an overrun controller 16.

Figure 2:
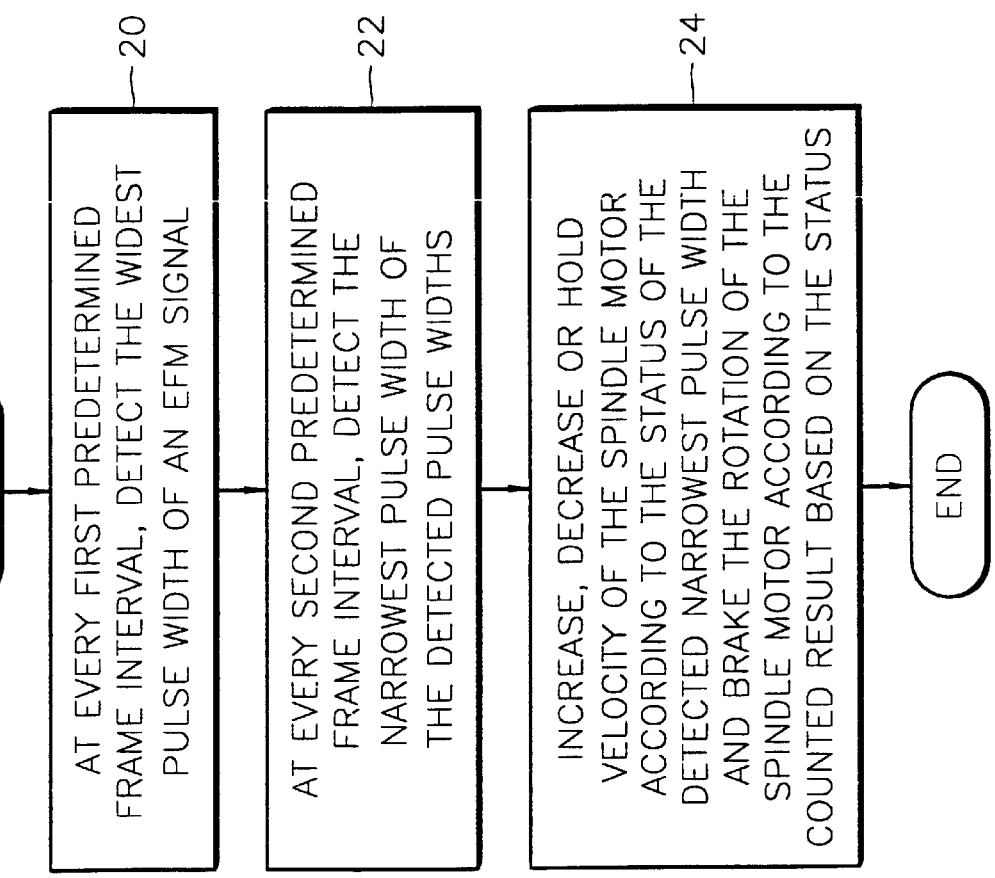
FIG. 2 is a flowchart illustrating one embodiment of a control method for controlling the velocity of a spindle motor according to the present invention.

FIG. 2 is a flowchart illustrating one embodiment of a control method for controlling the velocity of the spindle motor according to the present invention, which, in one embodiment, can be used in the apparatus shown in FIG. 1. The method according to the present invention includes steps shown as steps 20~24 for controlling the velocity of the spindle motor according to the narrowest pulse width among the pulse widths detected during a first predetermined frame interval.

The control apparatus for controlling the velocity of the spindle motor shown in FIG. 1 detects the widest pulse width of the EFM signal and/or EFM-PLUS signal at every first predetermined frame interval (step 20). The first predetermined frame interval, for example, represents a bit stream corresponding to two to four frames. Conventionally, a unit frame is 588 bit periods in length. Generally, the EFM signal is used in CD and the EFM-PLUS signal is used in DVD. With EFM-PLUS signal format a byte (8 bit) is converted into a 16 bit code word. The present invention is applied to the CD and DVD, but preferred embodiments of FIG. 1 and FIG. 2 are described with respect to only the CD.

To perform step 20, the widest signal detector 10 shown in FIG. 1 detects the widest pulse width among the pulse widths detected in the EFM signal according to main clock signal PLCK. Also, the detector 10 outputs first status signals LSIG1, SSIG1, and NSIG1, which represent the status of the detected pulse width, to the narrowest signal detector 12, in response to a frame clock signal RFCK divided by a first predetermined number j ($2 \leq j \leq 4$). Here, the notations LSIG, SSIG, and NSIG represent Long SIGnal, Short SIGnal, and Normal SIGnal, respectively. Also, the period of the frame clock signal RFCK is 576*Txck which is preset, where Txck is a period of the system clock signal generated in a quartz crystal oscillator (not shown) and, in one particular exemplary embodiment, is approximately 236 nanoseconds.

Figure 3:
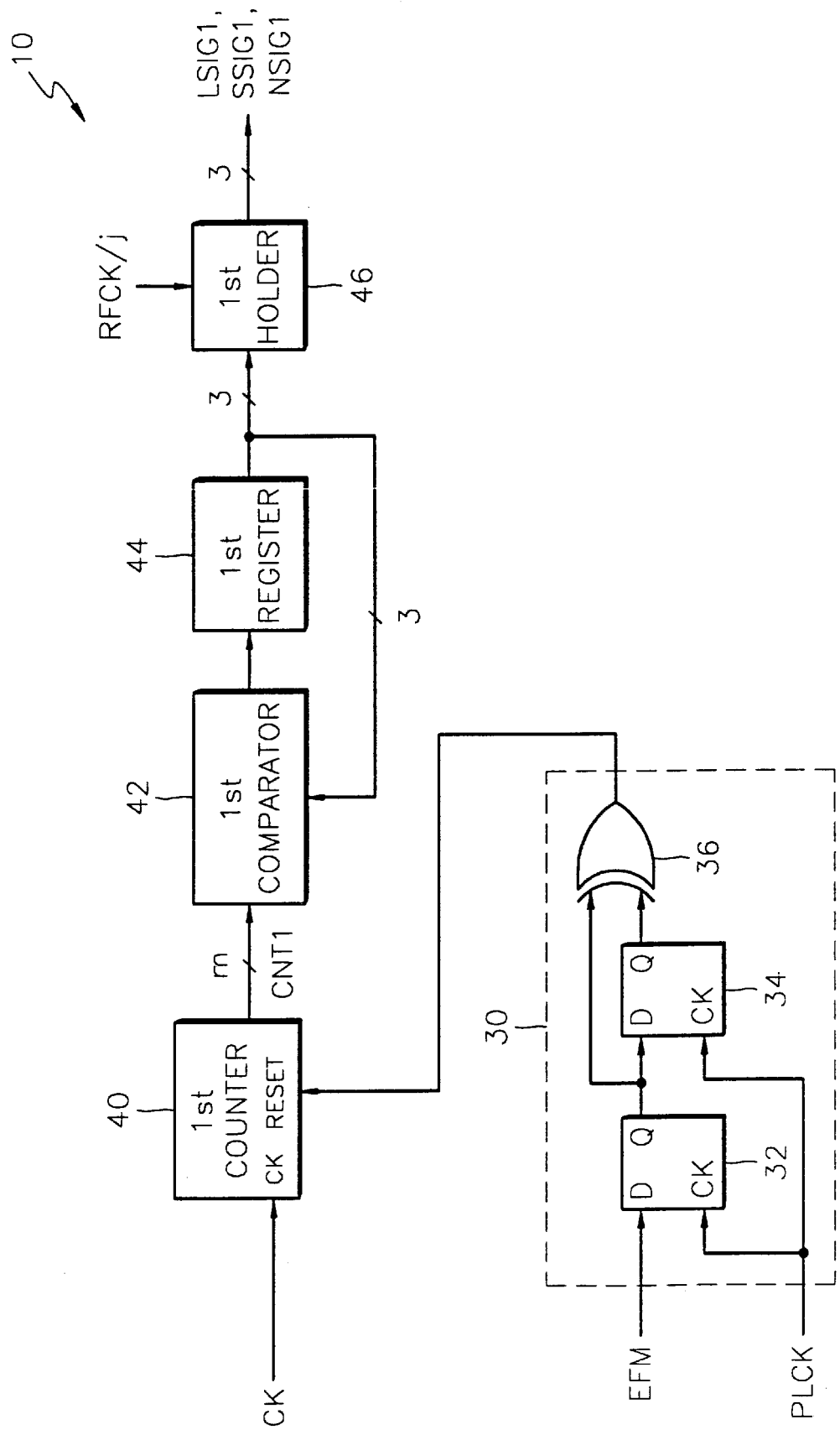
FIG. 3 is a schematic block diagram illustrating one embodiment of the widest signal detector shown in FIG. 1.

FIG. 3 is a block diagram illustrating one implementation of the widest signal detector 10 shown in FIG. 1. The widest signal detector 10 is comprised of a first edge detector 30, a first counter 40, a first comparator 42, a first register 44, and a first holder 46.

The first edge detector 30 detects an edge of the EFM signal in response to the main clock signal PLCK. To do this, the first edge detector 30 is comprised of first and second D flip-flops 32 and 34 and an eXclusive OR (XOR) gate 36. Here, the first D flip-flop 32 delays the EFM signal applied via a data input port D by 1T responding to the main clock signal PLCK applied via a clock port CK. Also, the D flip-flop 32 outputs the delayed result via a positive output port Q to a data input port D of the second D flip-flop 34. The second D flip-flop 34 delays the positive output Q of the first D flip-flop 32 applied via the data input port D by 1T responding to the main clock signal PLCK applied via a clock port CK. Also, the D flip-flop 34 outputs the delayed result via positive output port Q to the XOR gate 36. The XOR gate exclusively ORs the output of the first D flip-flop which is the EFM signal delayed by 1T and the output of the second D flip-flop which is the EFM signal delayed by 2T. The result, that is, the signal generated at the edge of the EFM signal, is transmitted to the reset port RESET of the first counter 40.

The first counter 40 is therefore reset in response to the output of the edge detector 30 applied via the reset port RESET, and performs counting in response to the clock signal CK. Here, the clock signal CK is a signal with the frequency of the main clock signal PLCK or a multiple thereof. For example, the period of the clock signal CK can be T/2. That is, the edge detector 30 and the first counter 40 can detect the widest pulse width of the EFM signal.

The first comparator 42 compares m-bit data, which is a counted result CNT1 of the first counter 40, with 3-bit data generated in the first register 44, and transmits the compared result to the first register 44. The first register 44 stores the compared result of the first comparator 42, and transmits the stored 3-bit data to the first comparator 42 and the first holder 46. The first holder 46 receives the 3-bit data from the first register 44, and transmits the received 3-bit data to the narrowest signal detector 12 responding to the signal RFCK divided by the first predetermined number j (RFCK/j), as the first status signals LSIG1, SSIG1, and NSIG1. In short, the first comparator 42, the first register 44, and the first holder 46 generate the first status signals LSIG1, SSIG1, and NSIG1, representing the status with respect to whether the detected widest pulse width is wider or narrower than the predetermined pulse width at every unit period of the signal RFCK divided by the first predetermined number j (RFCK/j), that is, at every first predetermined frame interval.

Here, the predetermined pulse width represents the pulse width of the frame synchronous signal when the spindle motor (not shown) rotates at a normal velocity. For example, the predetermined pulse width is 11T for CDs.

After step 20, the control apparatus for controlling the velocity of the spindle motor shown in FIG. 1 detects the narrowest pulse width among the pulse widths detected in the widest signal detector 10 at every second predetermined frame interval, which is wider than the first predetermined frame interval (step 22). Here, the second predetermined frame interval represents the bit steam corresponding to 16~128 frames, as an example.

To perform step 22, the narrowest signal detector 12 in FIG. 1 transmits the second status signals LSIG2, SSIG2, and NSIG representing the status of the narrowest pulse width of the first status signals LSIG1, SSIG1, and NSIG1 to the pulse width modulation signal generator 14 and the overrun controller 16 responding to the signal RFCK divided by the second predetermined number k (RFCK/k), where k>>j, and 16≦k≦128.

Figure 4:
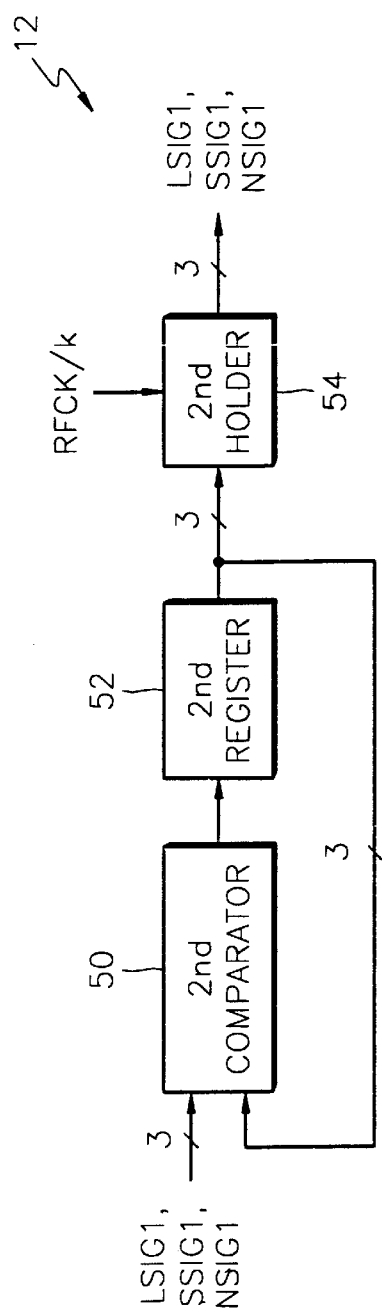
FIG. 4 is a schematic block diagram illustrating one embodiment of the narrowest signal detector shown in FIG. 1.

FIG. 4 is a block diagram illustrating the narrowest signal detector 12 shown in FIG. 1. In this embodiment, the detector 12 is comprised of a second comparator 50, a second register 52, and a second holder 54.

The second comparator 50 in FIG. 4 compares the first status signals LSIG1, SSIG1, and NSIG1 generated in the widest signal detector 10 with 3-bit data generated in the second register 52, and transmits the compared result to the second register 52. The second register 52 stores the compared result of the second comparator 50 and transmits the stored 3-bit data to the second comparator 50 and the second holder 54. The second holer 54 receives the 3-bit data from the second register 52 and generates the second status signals LSIG2, SSIG2, and NSIG2 responding to the signal RFCK divided by the second predetermined number k (RFCK/k).

That is, the second comparator 50, the second register 52, and the second holder 54 generate the second status signals LSIG2, SSIG2, and NSIG2, representing the status with respect to whether the detected narrowest pulse width among the detected widest pulse widths of the EFM signal during the second predetermined frame interval is wider or narrower than the predetermined pulse width at every unit period of the signal RFCK divided by the first predetermined number k (RFCK/k), that is, at every second predetermined frame interval. For example, when the narrowest pulse width is narrower than the predetermined pulse width, the signal SSIG2 is activated to a "high" logic level, while the signals LSIG2 and NSIG2 are deactivated to "low" logic levels. On the other hand, when the narrowest pulse width is wider than the predetermined pulse width, the signal LSIG2 is activated to the "high" logic level, while the signals SSIG2 and NSIG2 are deactivated to the "low" logic levels. Finally, when the narrowest pulse width is equal to the predetermined pulse width, the signal NSIG2 is activated to the "high" logic level, while the signals SSIG2 and LSIG2 are deactivated to the "low" logic levels.

After step 22, the velocity of the spindle motor (not shown) is increased, decreased, or held according to the status of the narrowest pulse width detected in the narrowest signal detector 12 (step 24). To do this, the pulse width modulation signal generator 14 in FIG. 1 transmits to the spindle motor (not shown) a velocity control signal SPIN_CON which is at the same logic level of the second status signals LSIG2, SSIG2, and NSIG2 generated in the narrowest signal generator 12. At this time, the velocity of the spindle motor (not shown) is increased, decreased or held according to the velocity control signal SPIN_CON generated in the pulse width modulation signal generator 14.

For example, the pulse width modulation signal generator 14 deactivates the velocity control signal SPIN_CON to the "low" logic level when SSIG2 is at the "high" logic level and LSIG2 and NSIG2 are at the "low" logic levels. Also, the pulse width modulation signal generator 14 activates the velocity control signal SPIN_CON to the "high" logic level when LSIG2 is at the "high" logic level and SSIG2 and NSIG2 are at the "low" logic levels. Finally, the pulse width modulation signal generator 14 generates a high impedance (HI-Z) as the velocity control signal SPIN_CON when NSIG2 is at the "high" logic level and SSIG2 and LSIG2 are at the "low" logic levels. At this time, the velocity of the spindle motor (not shown) is decreased in response to the velocity control signal SPIN_CON at the "low" logic level, increased in response to the velocity control signal SPIN_CON at the "high" logic level, and held as the present velocity in response to the high impedance.

Also, step 24 up-counts, down-counts or holds the previously counted result during the above-described second predetermined frame interval according to the status of the narrowest pulse width detected in the narrowest signal detector 12. The step 24 applies braking to the rotation of the spindle motor (not shown) according to the condition with respect to whether the currently counted result is smaller than the overrun upper limit value ($n_h$) and greater than the overrun lower limit ($n_l$).

To do this, the overrun controller 16 in FIG. 1 up-counts, down-counts or holds the previously counted result according to the signal RFCK divided by the second predetermined number k (RFCK/k), and the second status signals SSIG2, LSIG2, and NSIG2. The overrun controller 16 compares the currently counted result with the overrun upper limit value ($n_h$) and the overrun lower limit value ($n_l$), and transmits the first and second flag signals FLAG1 and FLAG2, which cause the servo to brake the rotation of the spindle motor (not shown), to the spindle motor (not shown) according to the compared result.

Figure 5:
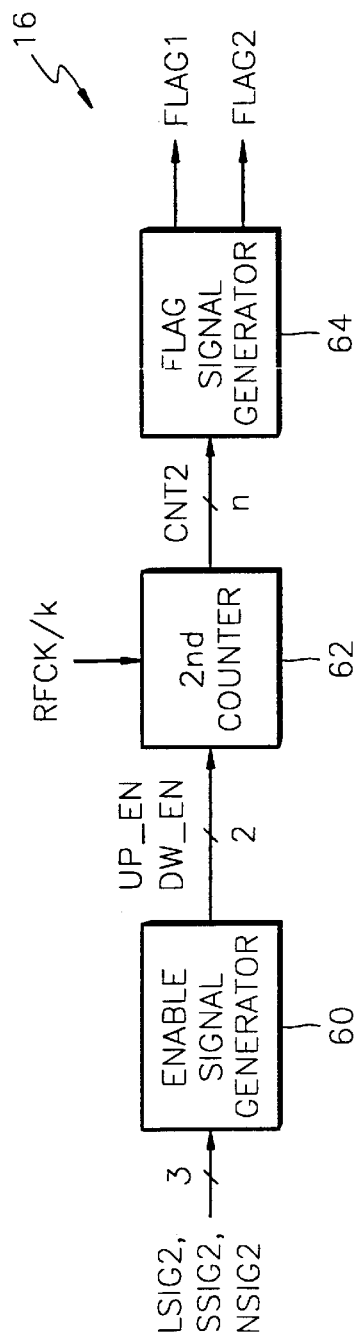
FIG. 5 is a schematic block diagram illustrating one embodiment of the overrun controller shown in FIG. 1.

FIG. 5 is a block diagram of one embodiment of the overrun controller 16 shown in FIG. 1. The overrun controller 16 is comprised of an enable signal generator 60, a second counter 62, and a flag signal generator 64.

Figure 6:
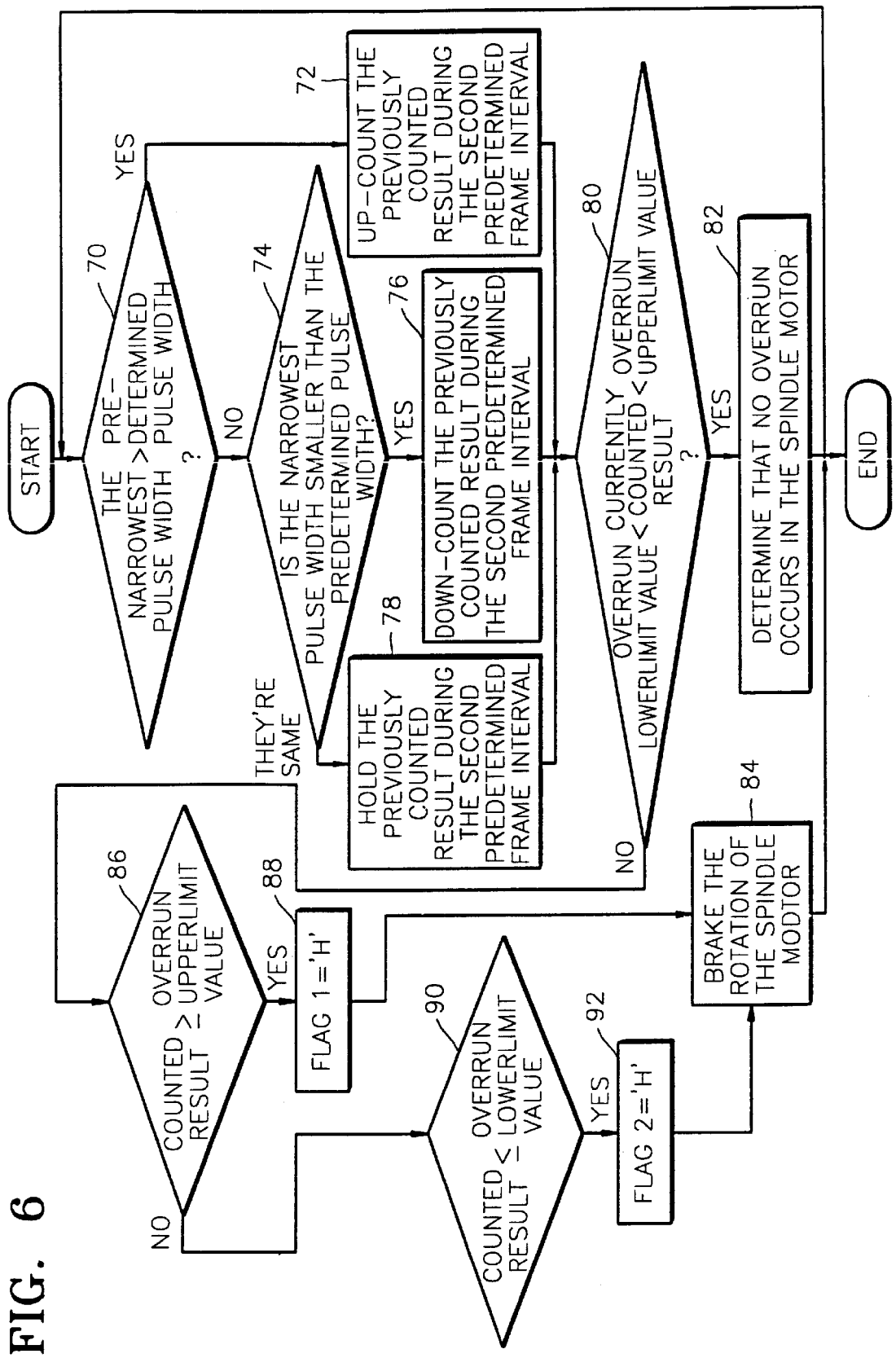
FIG. 6 is a detailed flowchart of step 24 of the flowchart of FIG. 2 used in the overrun controller shown in FIG. 5 according to the present invention.

FIG. 6 is a detailed flowchart of step 24 of the flowchart of FIG. 2, which can be used in the overrun controller 16 shown in FIG. 5 according to the present invention. As shown in FIG. 6, step 24 is comprised of steps 70~78 of counting the pulse number using the status of the narrowest pulse width and steps 80–92 of controlling the velocity of the spindle motor using the counted result.

To perform step 24 in FIG. 2, it is determined in step 70 whether the narrowest pulse width detected in step 22 is wider than the predetermined pulse width. If the narrowest pulse width detected in step 22 is wider than the predetermined pulse width, then in step 72 the previously counted result is up-counted during the second predetermined frame interval. On the other hand, when the narrowest pulse width detected in step 22 is not wider than the predetermined pulse width, then it is determined in step 74 whether the narrowest pulse width detected in step 22 is narrower than the predetermined pulse width. When the pulse width detected in step 22 is narrower than the predetermined pulse width, the previously counted result is down-counted during the second predetermined frame interval in step 76. But, when the pulse width detected in step 22 is equal to the predetermined pulse width, the previously counted result is held in step 78 during the second predetermined frame interval.

To perform steps 70–78, the enable signal generator 60 in FIG. 5 transmits an upward enable signal UP_EN and a downward enable signal DW_EN at the logic levels determined according to the second status signals SSIG2, LSIG2, and NSIG2 transmitted from the narrowest signal detector 12 to the second counter 62. The structure and the operation of one embodiment of the enable signal generator 60 according to the present invention is shown and described in detail in accordance with the following description in connection with FIG. 7.

Figure 7:
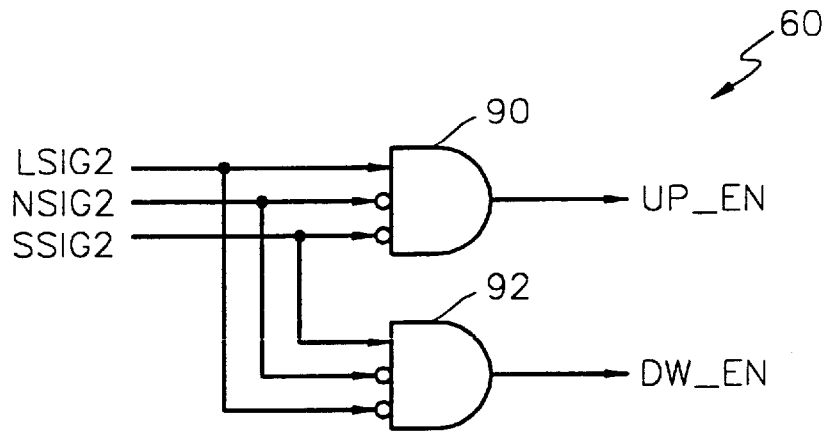
FIG. 7 is a schematic diagram of one embodiment of the enable signal generator shown in FIG. 5 according to the present invention.

FIG. 7 is a view of one preferred embodiment of the enable signal generator 60 shown in FIG. 5 according to the present invention. The enable signal generator 60 is comprised of first and second AND gates 90 and 92. The first AND gate 90 in FIG. 7 ANDs LSIG2, inverted NSIG2, and inverted SSIG2, and transmits the ANDed result to the second counter 62 as the upward enable signal UP_EN. The second AND gate 92 ANDs SSIG2, inverted NSIG2, and inverted LSIG2, and transmits the ANDed result to the second counter 62 as the downward enable signal DW_EN. For example, when LSIG2 of the second status signals is at the "high" logic level and SSIG2 and NSIG2 are at the "low" logic levels, the upward enable signal UP_EN is generated as the "high" logic level and the downward enable signal DW_EN is generated as the "low" logic level. Further, when SSIG2 of the second status signals is at the "high" logic level and LSIG2 and NSIG2 are at the "low" logic levels, the upward enable signal UP_EN at the "low" logic level and the downward enable signal DW_EN at the "high" logic level are generated. Also, when NSIG2 of the second status signals is at the "high" logic level and SSIG2 and LSIG2 are at the "low" logic levels, respectively, the upward enable signal UP_EN and the downward enable signal DW_EN are both generated as the "low" logic levels.

At this time, the second counter 62 up-counts, down-counts or holds the previously counted result in response to the signal RFCK divided by the second predetermined number k (RFCK/k), and the upward and downward enable signals UP_EN and DW_EN. The second counter 62 transmits the currently counted result CNT2 or n-bit data CNT2 which is the previously held counted result, to the flag signal generator 64. When the enable signal generator 60 in FIG. 5 is formed as shown in FIG. 7 and generates the upward and downward enable signals UP_EN and DW_EN under the above-described conditions, the second counter 62 performs up-counting during the period of the signal RFCK/k in response to the upward enable signal UP_EN at the "high" logic level and the downward enable signal DW_EN at the "low" logic level. Also, the second counter 62 performs down-counting during the period of the signal RFCK/k in response to the upward enable signal UP_EN at the "low" logic level and the downward enable signal DW_EN at the "high" logic level. However, the second counter 62 holds the previously counted result and transmits the held result to the flag signal generator 64 when both of the upward and downward enable signals UP_EN and DW_EN are applied as the "low" logic level.

Figure 8:
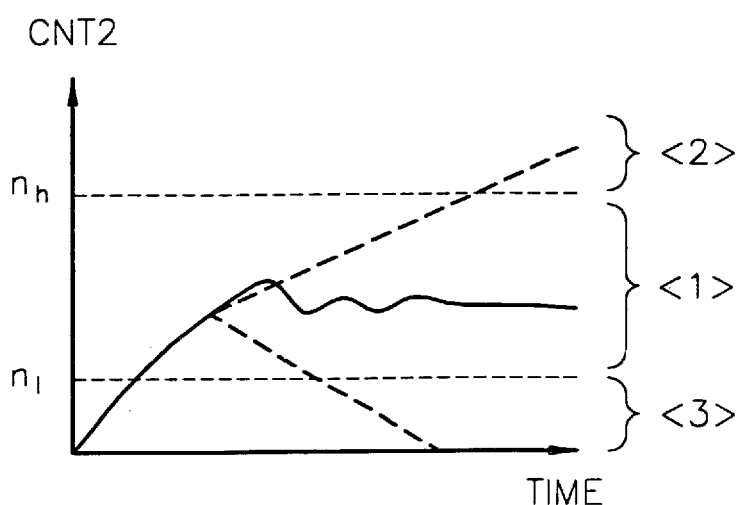
FIG. 8 is a graph illustrating the operation of the overrun controller shown in FIG. 5.

FIG. 8 is a graph illustrating the operation of the overrun controller 16 shown in FIG. 5. The horizontal axis represents time, and the vertical axis represents the counted result CNT2 of the second counter 62.

Figure 9:
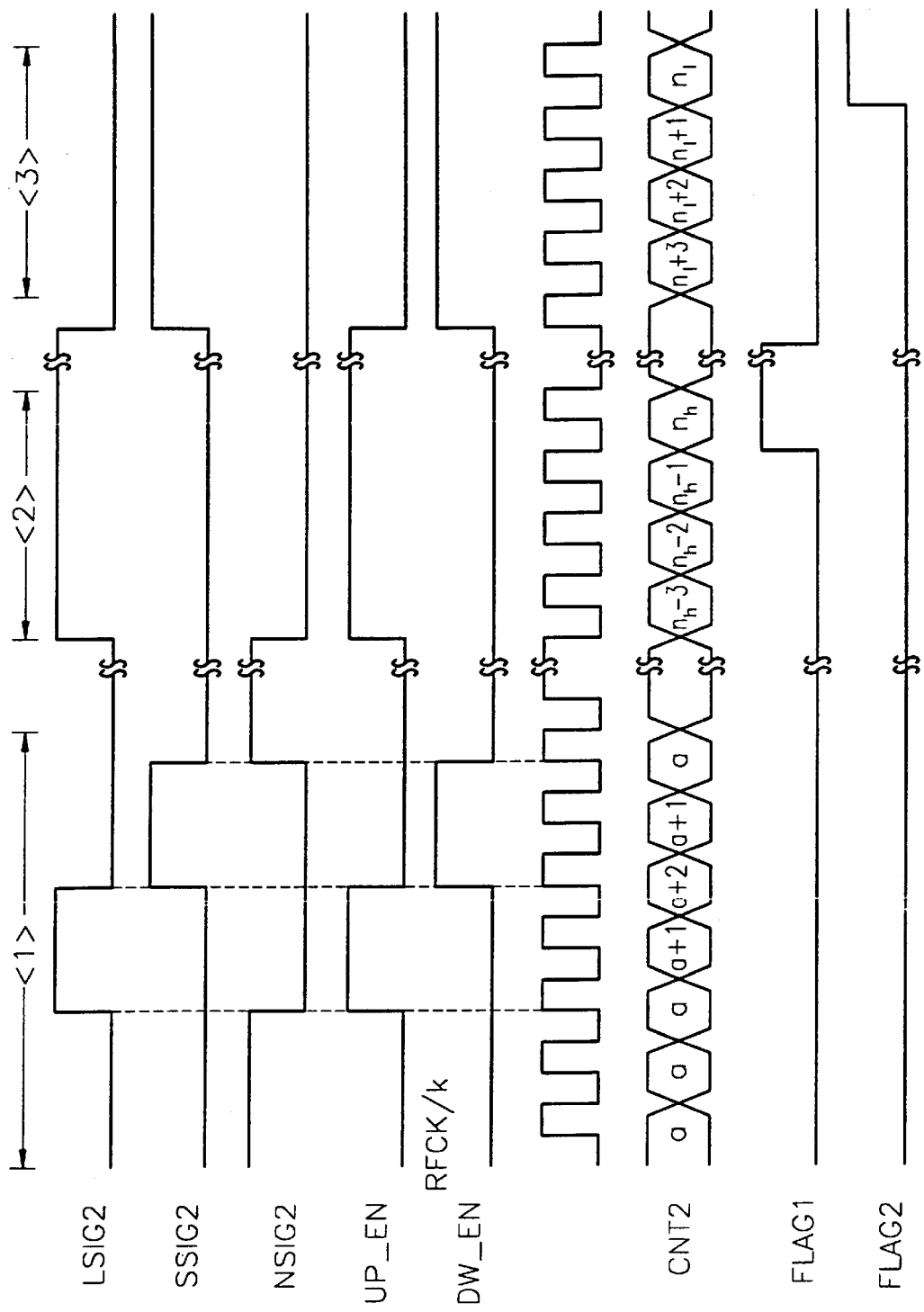
FIG. 9 is a diagram illustrating waveforms of elements of the overrun controller shown in FIG. 5.

FIG. 9 is a timing diagram illustrating waveforms of elements of the overrun controller 16 shown in FIG. 5.

After the steps 72, 76 or 78, the flag signal generator 64 determines if the n-bit counted result CNT2 of the second counter 62 is smaller than the overrun upper limit value ($n_h$) and greater than the overrun lower limit value ($n_l$) in step 80. That is, the flag signal generator 64 determines if the counted result CNT2 of the second counter 62 is in the range of a safety zone <1> shown in FIG. 8. If the n-bit counted result CNT2 is smaller than the overrun upper limit value ($n_h$) and greater than the overrun lower limit value ($n_l$), the flag signal generator 64 determines that no overrun occurs in the spindle motor (not shown), and transmits the first and second flag signals FLAG1 and FLAG2 corresponding to the determination to the spindle motor (not shown). Also, in step 82, the velocity of the spindle motor (not shown) is controlled according to the velocity control signal SPIN_CON. That is, when the spindle servo is stable, the counted result CNT2 in the range <1> converges to a constant value as shown in FIGS. 8 and 9. Generally, rotating the static disk requires large current to drive the spindle motor initially. So, the above-described velocity control signal SPIN_CON is generated as the "high" logic level and the second counter 62 performs up-counting. At this time, as the velocity of the spindle motor (not shown) is close to the velocity of the steady state, the counted value of the second counter 62 converges to a constant value 'a' while performing up-counting and down-counting repeatedly as shown in FIG. 9. Here, it can be seen that the first and second flag signals FLAG1 and FLAG2 in FIG. 9 maintain the "low" logic level.

However, when the n-bit result CNT2 counted in the second counter 62 is greater than the overrun upper limit value ($n_h$) or smaller than the overrun lower limit value ($n_l$), the flag signal generator 64 transmits the first and second flag signals FLAG1 and FLAG2 to the spindle motor (not shown) to stop the rotation of the spindle motor in step 84. That is, the forward or backward overrun of the spindle motor occurs because the n-bit result CNT2 of the second counter 62 does not converge in the range <1> shown in FIG. 8 but continues to increase or decrease to the first or second dead zone <2> or <3> due to the existence of defects on the disk surface.

Figure 10:
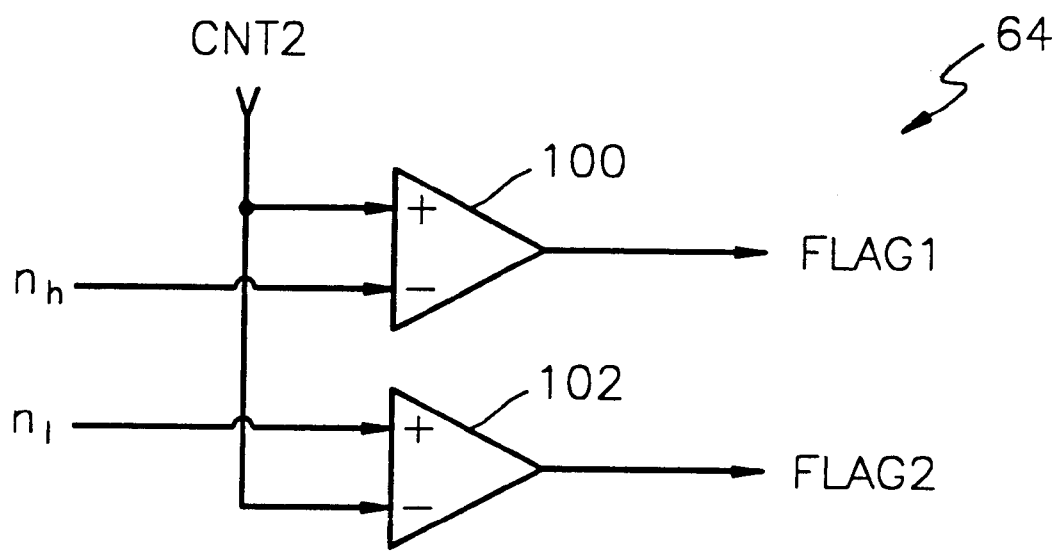
FIG. 10 is a schematic diagram of one embodiment of the flag signal generator shown in FIG. 5 according to the present invention.

The structure and operation of the overrun controller 16 in FIG. 5 for preventing the forward or backward overrun of the spindle motor (not shown) is described in accordance with the following. FIG. 10 is a diagram of an embodiment of the flag signal generator 64 shown in FIG. 5 according to the present invention. The flag signal generator 64 includes first and second comparators 100 and 102.

The first comparator 100 in FIG. 10 includes a positive input port (+) receiving the counted result CNT2 of the second counter 62, a negative input port (−) receiving the overrun upper limit value ($n_h$), and an output port transmitting the first flag signal FLAG1. Also, the second comparator 102 includes a positive input port (+) receiving the overrun lower limit value ($n_l$), a negative input port (−) receiving the counted result CNT2 of the second counter 62, and an output port transmitting the second flag signal FLAG2.

To perform steps 80~92 in the above-described configuration, the first comparator 100 compares the counted result CNT2 from the second counter 62 with the overrun upper limit value ($n_h$) to determine whether the former is greater than the latter in step 86, and outputs the compared result as the first flag signal FLAG1 in step 88. Also, the second comparator 102 compares the counted result CNT2 from the second counter 62 with the overrun lower limit value to determine whether the former is smaller than the latter in step 90, and outputs the compared result as the second flag signal FLAG2 in step 92.

For example, when the counted result CNT2 is in the range <2> in FIGS. 8 and 9, the first flag signal FLAG1 at the "high" logic level and the second flag signal FLAG2 at the "low" logic level are generated as the counted result CNT2 reaches the overrun upper limit value ($n_h$). At this time, the spindle motor (not shown) overrunning forwards stops rotating in response to the first flag signal FLAG1 at the "high" logic level and the second flag signal FLAG2 at the "low" logic level. However, when the counted result CNT2 is in the range <3> in FIGS. 8 and 9, the first flag signal FLAG1 at the "low" logic level and the second flag signal FLAG2 at the "high" logic level are generated as shown in FIG. 9 as the counted result CNT2 reaches the overrun lower limit value ($n_l$). At this time, the spindle motor (not shown) overrunning backwards stops rotating in response to the first flag signal FLAG1 at the "low" logic level and the second flag signal FLAG2 at the "high" logic level. The reason of using two flag signals FLAG1 and FLAG2 to stop the rotation of the spindle motor (not shown) is that the polarities of control voltages preventing forward and backward overrun are opposite to each other.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A control apparatus for controlling velocity of a spindle motor in an optical disk reproducing system, comprising:

a widest signal detector for (i) detecting the widest pulse width of at least one of an eight-to-fourteen modulation (EFM) signal and an EFM-PLUS signal in response to a main clock signal and (ii) generating first status signals representing the status of the detected pulse width in response to a frame clock signal, said frame clock signal being divided by a first predetermined number j;

a narrowest signal detector for generating second status signals representing the status of the narrowest pulse width of the first status signals in response to the frame clock signal, said frame clock signal being divided by a second predetermined number k, where k is greater than j; and an overrun controller for (i) performing one of up-counting, down-counting and holding a previously counted result, according to the frame clock signal divided by the second predetermined number and the second status signals, (ii) comparing the currently counted result with overrun upper limit and lower limit values, and (iii) generating first and second flag signals to brake the rotation of the spindle motor according to the compared result.

2. The control apparatus according to claim 1, further comprising a pulse width modulation signal generator which generates a velocity control signal with logic levels corresponding to logic levels of the second status signals and transmits the velocity control signal to the spindle motor, wherein the velocity of the spindle motor is controlled according to the velocity control signal.

3. The control apparatus according to claim 1, wherein said overrun controller comprises:

an enable signal generator for generating upward and downward enable signals with logic levels determined by the second status signals;

counter for performing up-counting, down-counting and holding the previously counted result in response to the upward and downward enable signals during a predetermined period of the frame clock signal divided by the second predetermined number; and a flag signal generator comparing the currently counted result with the overrun upper limit and lower limit values, and generating the first and second flag signals according to the compared result.

4. The control apparatus according to claim 3, wherein said flag signal generator comprises:

a first comparator for comparing the currently counted result with the overrun upper limit value and generating the compared result as the first flag signal; and a second comparator for comparing the currently counted result with the overrun lower limit value and generating the compared result as the second flag signal.

5. A control method for controlling velocity of a spindle motor in an optical disk reproducing system, comprising the steps of:

(a) at each first predetermined frame interval, detecting the widest pulse width of at least one of an EFM signal and an EFM-PLUS signal;

(b) at each second predetermined frame interval wider than the first predetermined frame interval, detecting the narrowest pulse width of the pulse widths detected in step (a);

(c) controlling a previously counted result during the second predetermined frame interval according to the status of the pulse width detected in step (b), and braking the rotation of the spindle motor according to whether the currently counted result is smaller than an overrun upper limit value and greater than an overrun lower limit value.

6. The control method according to claim 5, wherein step (c) further comprises the step of (d) controlling the velocity of the spindle motor according to the status of the pulse width detected in step (b).

7. The control method according to claim 5, wherein said step (c) comprises the steps of:

(c1) determining if the pulse width detected in step (b) is greater than a predetermined pulse width;

(c2) performing up-counting of the counted result during the second predetermined frame interval if the pulse width detected in step (b) is greater than the predetermined pulse width;

(c3) when the pulse width detected in the step (b) is not greater than the predetermined pulse width, determining if the pulse width detected in step (b) is smaller than the predetermined pulse width;

(c4) when the pulse width detected in step (b) is smaller than the predetermined pulse width, performing down-counting of the counted result during the second predetermined frame interval;

(c5) when the pulse width detected in step (b) is equal to the predetermined pulse width, holding the counted result during the second predetermined frame interval;

(c6) determining if the currently counted result of the step (c2), (c4) or (c5) is smaller than the overrun upper limit value and greater than the overrun lower limit value;

(c7) determining that no overrun occurs when the currently counted result is smaller than the overrun upper limit value and greater than the overrun lower limit value; and (c8) stopping the rotation of the spindle motor if the currently counted result is greater than the overrun upper limit value or smaller than the overrun lower limit value.

* * * * *